July 6, 1965 A. L. FRIEND 3,193,812

MISSING BIT DETECTOR ON RECORDED STORAGE MEDIA

Filed May 16, 1961 2 Sheets-Sheet 1

INVENTOR.
AARON L. FRIEND
BY:
William C. Cahill

July 6, 1965 A. L. FRIEND 3,193,812

MISSING BIT DETECTOR ON RECORDED STORAGE MEDIA

Filed May 16, 1961 2 Sheets-Sheet 2

INVENTOR
AARON L. FRIEND
BY:
William C. Cahill

United States Patent Office 3,193,812
Patented July 6, 1965

3,193,812
MISSING BIT DETECTOR ON RECORDED STORAGE MEDIA

Aaron L. Friend, Phoenix, Ariz., assignor to General Electric Company, a corporation of New York Filed May 16, 1961, Ser. No. 110,419
10 Claims. (Cl. 340—174.1)

This invention pertains to apparatus for detecting binary bits recorded on a storage media, and more particularly to apparatus for detecting irregularities in columns of binary bits recorded on a storage media.

In data processing systems utilizing binary codes for the representation of information, the element of information, termed a "bit," is designated as a 1 or a 0. These binary bits are combined to form words which may represent numbers, letters, or other information. The storage of this information requires that the storage media be capable of retaining a measurable physical representation of each binary bit of the information word. For example, the word stored on or in the storage media must be capable of detection at each bit location as a binary "1" or "0."

The information may be stored by the data processor in various ways, including magnetic tape, punch tape, magnetic drum, magnetic disc, etc. In storage media such as magnetic tape, the binary information is stored in the form of magnetically polarized portions of a magnetizable surface on the storage media. It is customary, when utilizing such storage media, to store information in a plurality of side-by-side tracks or channels to permit the simultaneous writing and reading of several binary bits. Thus, several write heads are placed side-by-side to write in corresponding channels. However, it is impossible to perfectly align the write heads as well as to maintain the storage media travel in a direction perfectly perpendicular to the line of the write heads. Accordingly, the bits simultaneously written on the storage media by the write heads form a column of bits which are not in alignment (misaligned) and which do not form a line perfectly perpendicular to the direction of media travel (skew). Similarly, defects in the storage media may prevent the proper writing of the binary bit at a particular bit location; therefore, a bit written in the immediate vicinity of the defect may fail to properly polarize the magnetizable surface of a magnetizable media, or properly record the bit in other types of storage media.

Since writing heads cannot be perfectly aligned, thereby causing irregular bit columns, and since missing bits and tape skew occur while recording binary information on a storage media such as magnetic tape, it is important to have a means for detecting these faults so that appropriate remedial action may be taken.

Accordingly, it is a primary object of the present invention to provide apparatus for detecting irregularities in a column of binary bits recorded on a transfer media.

It is another object of the present invention to provide an apparatus for detecting a missing bit of a column of bits recorded on a storage media.

It is a further object of the present invention to provide apparatus for detecting excessive tape skew.

It is still another object of the present invention to provide apparatus for detecting excessive misalignment of the write heads utilized to record the binary information on the storage media.

Further objects and advantages of the present invention will become apparent as the description thereof proceeds.

Briefly stated, in accordance with one embodiment of the present invention, a plurality of bit detectors is provided, one detector for each bit of a column of bits, for generating signals in response to each bit. A logical gate is provided for receiving a signal from one of the bit detectors when the first bit of a column of bits is detected. The logical gate provides a means for causing a bistable circuit to assume a given stable state when the logical gate receives the first signal from the detector. When the bistable circuit assumes the given stable state, a monostable circuit is fired and a designated time interval measurement is instigated. When all of the bits of a column of bits have been detected, a second logical gate is provided for receiving corresponding signals from each of the bit detectors; the second logical gate causes a second bistable circuit to assume a given state. The second bistable circuit having assumed the given stable state, causes the first bistable circuit to assume a second stable state. The first bistable circuit and the monostable circuit are connected to a logical gate to provide an error signal when, and if, the first bistable circuit fails to assume its second stable state prior to the expiration of the designated time interval measured by the delay of the monostable circuit.

The invention, both as to its organization and operation, together with further objects and advantages thereof, may best be understood by reference to the following description taken in connection with the accompanying drawings in which.

To facilitate the description of the present invention, it may be useful to describe the problems encountered while reading columns of binary bits from a storage media. Although the present invention is applicable to any type of storage media having columns of binary bits recorded thereon, the invention will be illustrated in connection with its application to magnetic tape storage.

Figure 1:
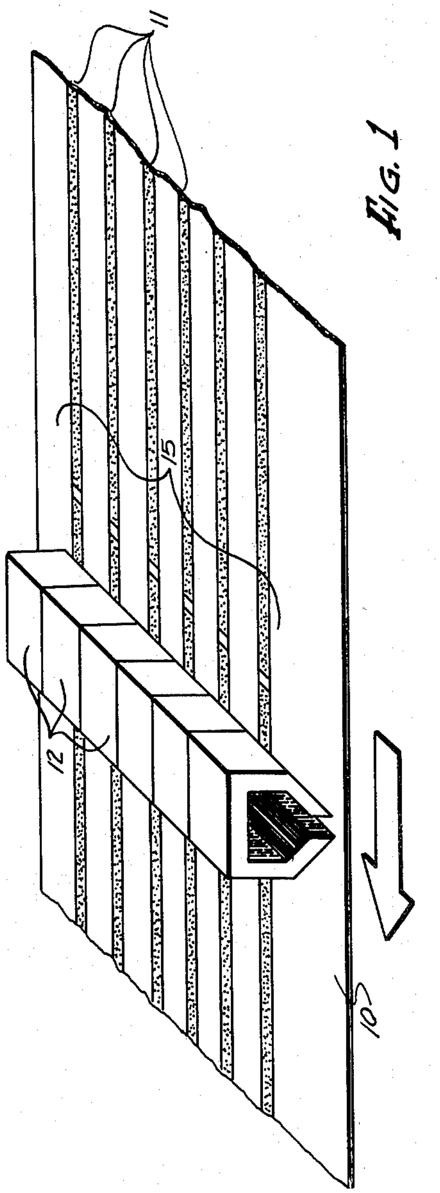
FIG. 1 is a schematic illustration of a plurality of read heads for detecting bits recorded on a magnetic tape.

Referring to FIG. 1, a section of magnetic tape 10 is shown having a plurality of channels 11 thereon. Each of the channels 11 passes beneath a corresponding read head 12. The magnetic tape includes a surface of magnetizable material which may be magnetically polarized to represent binary "1's" and "0's"; accordingly, each of the channels 11 may contain binary information represented by the direction of polarization of the magnetizable surface.

There are several ways for representing binary information on magnetic tape; however, one of the most common methods is the "non-return-to-zero" method. In this method, the polarizing means (write heads) are energized with current in a given direction, thereby causing polarization of the corresponding channel on the magnetic tape in a given direction. This current, and thus the polarization of the tape surface, is maintained in the same direction continuously unless it is desired to write a binary "0". Thus, a channel on the magnetic tape will always be polarized in one of two directions, and will contain a binary "1" in all bit positions unless the direction of polarization is changed in that bit position. Each of the channels 11 of FIG. 1 are thus polarized in one of two directions. Assuming that a bit is to be written in each channel simultaneously, a column of bits 15 is formed on the magnetic tape. Theoretically, when the column of bits 15, one bit in each of the channels 11, passes beneath the read heads 12, a bit will be detected by the read heads in each channel, and the detection of these bits will be simultaneous. However, the simultaneous detection of all bits in a column of bits seldom occurs.

Figure 2:
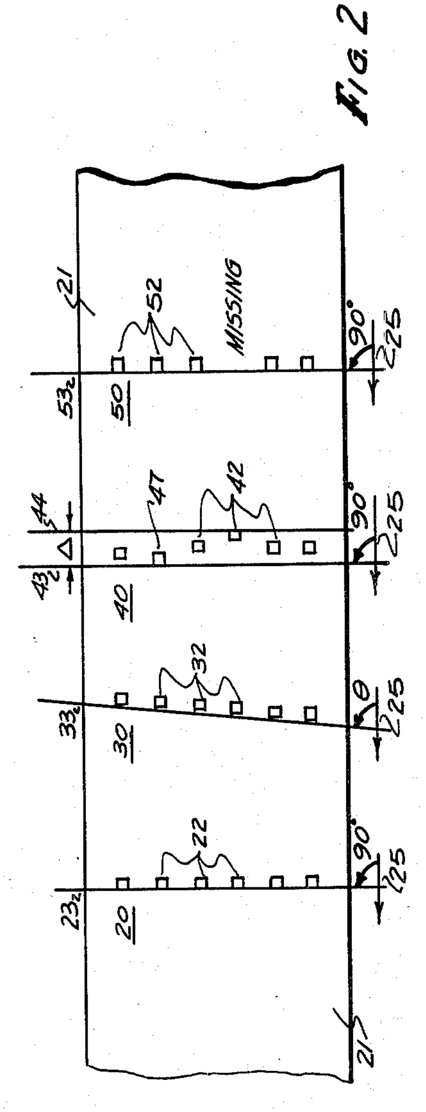
FIG. 2 is a schematic diagram illustrating possible bit positions of the bits in various columns of binary bits recorded on a storage media.

Referring to FIG. 2, the various irregularities occurring in a column of bits are shown. The first column of bits 20 shows the theoretical position of each bit on the magnetic tape 21. Each of the bits 22 are in perfect alignment with each other, and a line 23 drawn through the leading edge of each bit will form a 90° angle with the direction of tape travel as illustrated by the arrow 25. The second column of bits 30 indicates the condition existing when tape skew is encountered. Each of the bits 32 are in alignment; however, a line 33 drawn through the leading edge of each of the bits 32, forms an angle $\theta$ with the direction of tape travel that is greater or less than 90°.

The third column of bits 40 illustrates the condition existing when the write heads utilized to write the bits in the column are not in alignment. Some of the bits 42 of the column 40 are misaligned with respect to the remainder of the bits. Therefore, even though a line 43 drawn through the leading edge of the first bits of the column forms a 90° angle with the direction of tape travel, a time lag will present itself between the detection of the first bits and the last bit of the column as illustrated by the distance Δ beween lines 43 and 44.

The fourth column of binary bits 50 illustrates the conditions existing in a column of bits when an imperfection in the magnetic tape, or a faulty read head, prevents one of the bits of the column from being recorded. "The missing bits" may be completely absent, or may be polarized portion of the tape which polarization is so far below saturation as to negate the possibility of detection.

Although the irregularities in the columns of bits shown in FIG. 2 are segregated into separate faults, i.e., skew, misalignment, and missing bit, it will be obvious that in practice, combinations of these faults will occur in a single column of bits. Also, when a plurality of bit columns are recorded on a storage media, imperfections in the storage media between the bit columns may cause an erroneous reading in a data processing system. This latter fault may also occur in combination with the previously described faults.

Figure 3:
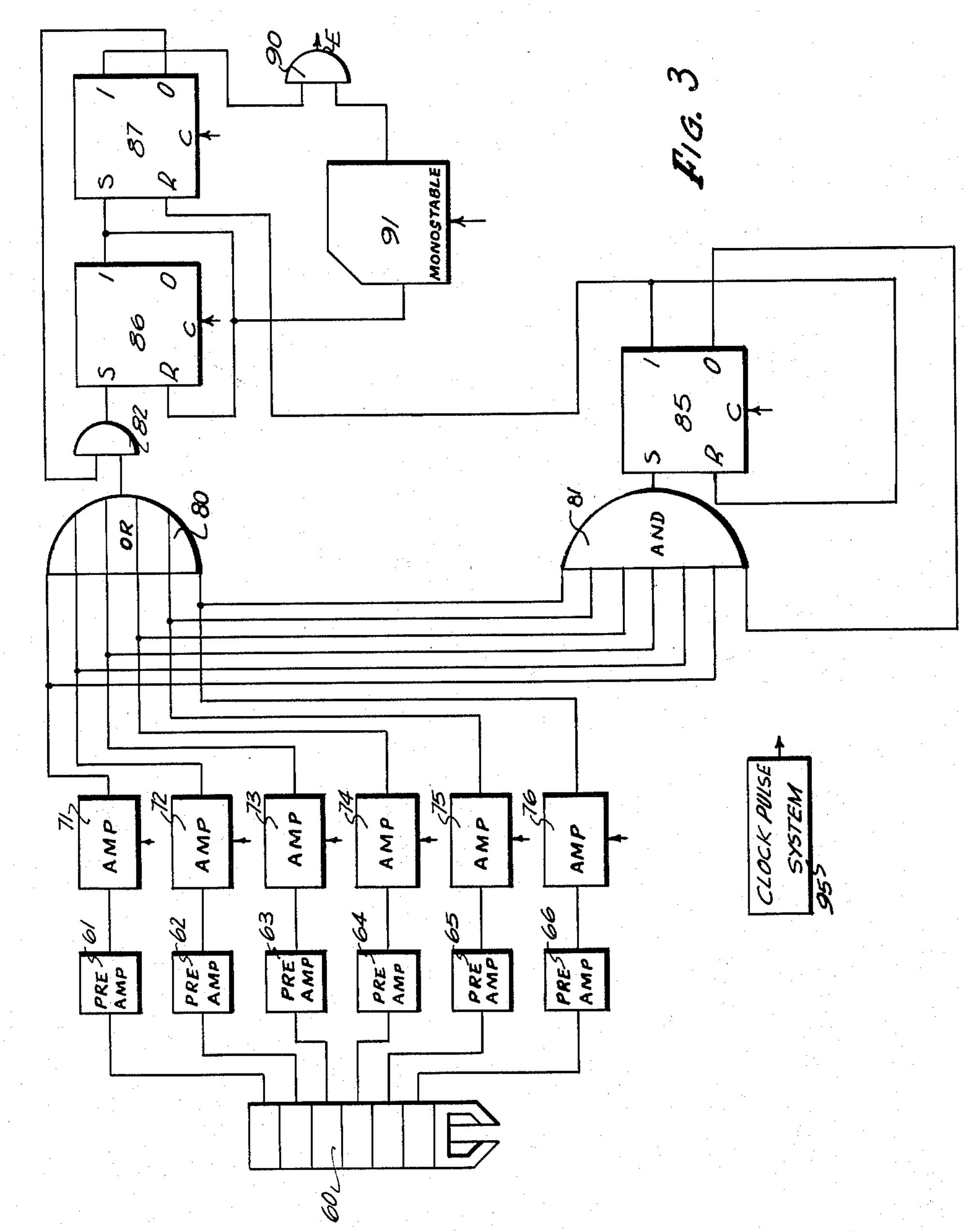
FIG. 3 is a logical diagram of one embodiment of the present invention.

Referring to FIG. 3, a plurality of binary bit sensing means 60 are shown, and are arranged so that each sensing means will sense a single bit of a column of bits as the column passes the sensing means. Each of the sensing means provides a signal in response to a sensed bit which is supplied to a corresponding preamplifier 61–66. Each preamplifier amplifies the signal received from its corresponding sensing means, and applies the amplified signal to corresponding amplifiers 71–76. Each of the amplifiers 71–76 is connected to two logical gates 80 and 81. Logical gate 80 may be described as an OR-gate which performs the logical operation Inclusive-OR for positive input signals applied thereto. The logical gate 80 is shown having six input terminals, one for each amplifier connected thereto, and is adapted to provide a positive output signal when any of the input signals applied thereto are positive. Therefore, the first bit of a column of bits to be detected by its sensing means will cause a signal to be amplified by the corresponding preamplifier and amplifier and applied to the logical gate 80. This signal applied to logical gate 80, will cause the gate to generate a positive signal and apply it to AND-gate 82. Similarly, the signal generated by the sensing of the first bit of a column of bits will be applied, through the preamplifier and amplifier, to the logical gate 81. Logical gate 81 may be described as an AND-gate. An AND-gate provides the logical operation of Conjunction for positive signals applied thereto; therefore, an AND-circuit such as AND-gate 81, will provide a positive output signal only when all of the input signals thereto are positive. Since logical gate 81 is an AND-gate, no signal will be generated thereby until all the positive input signals thereto are received from the corresponding amplifiers. When all of the bits of a column of bits are sensed, and signals from all of the bits pass through corresponding preamplifiers and amplifiers, and are applied to the logical AND-gate 81, a positive signal will be applied to a bistable circuit, or flip-flop, 85. The flip-flop 85, and the other flip-flops to be described in connection with this embodiment of the invention, may be any bistable device which, upon receipt of an appropriate signal at one input terminal and a clock pulse, will assume one bistable state at the clock pulse, and may be triggered to the other stable state at a clock pulse by applying a corresponding signal at the other of its input terminals. The particular flip-flops illustrated include a set input terminal (S), a reset terminal (R), a clock terminal (C), a 1 output terminal and a 0 output terminal. A positive voltage level applied to either the set or the reset terminals causes the flip-flop to assume the 1 or 0 state respectively at the receipt of the next clock pulse from a clock pulse source. In this manner, the flip-flops remain in their respective stable states until a positive voltage signal is applied to the input terminal thereof corresponding to the opposite stable state. The flip-flop will then assume the opposite stable state when the next clock pulse is received.

The output terminal of AND-gate 82 is connected to the set input terminal of a flip-flop 86. Thus, when a positive signal is generated by the AND-gate 82, flip-flop 86 will assume the set state at the next clock pulse, and the 1 output thereof will assume a positive voltage level. The 1 output of the flip-flop 86 is connected to a flip-flop 87; the 0 output of the flip-flop 87 is joined to the input of the AND-gate 82. Thus, when the 1 output of flip-flop 86 assumes a positive voltage level, flip-flop 87 will assume the set state, and generate a positive voltage level at the 1 output thereof. The 1 output of flip-flop 87 is connected to an AND-gate 90. AND-gate 90 is also supplied with a signal from a one-shot circuit 91. The one-shot circuit 91 may be any type of timing device adapted to assume an unstable state for a predetermined time, and adapted to return to its stable state at the expiration of that time. The timing means may conveniently be a monostable multivibrator which may be fired to its unstable state by the application of a positive voltage level at the input terminal thereof. The output of the one-shot 91 is a continuous positive voltage level while it is in the stable state, and is a negative voltage level during the time that the circuit is in its unstable state. One-shot 91 is provided with an input signal from the 1 output of the flip-flop 86.

To cause flip-flops 85 and 86 to return to the reset state after becoming set, the 1 output terminal of each is connected to its corresponding reset input terminal. Therefore, when either flip-flop assumes the set state, the reset input terminal thereof is raised to a positive voltage level, and the next clock pulse will cause each to return to its reset state. The 1 output of flip-flop 85 is applied to input terminal of flip-flop 87, thereby causing flip-flop 87 to assume the reset state when flip-flop 85 assumes the set state. A clock pulse system 95 is provided for synchronizing the operation of the flip-flops and one-shot of the embodiment shown in FIG. 3. Pulses from the clock pulse system 95 are applied to the various system elements, to control the change of state of each flip-flop and the firing of the one-shot 91. As mentioned previously, when a positive voltage level is applied to a terminal of a flip-flop, the flip-flop does not immediately change state; however, when an input terminal is at a positive voltage level, the flip-flop will assume the corresponding stable state when the next clock pulse is received by the flip-flop. Similarly, when a positive voltage level is applied to the input of the one-shot 91, the one-shot will be fired at the next succeeding clock pulse applied thereto from the clock pulse system 95. Therefore, the changes of state of the various elements of the system shown in FIG. 3 are controlled in synchronism through the pulses of the clock system.

Circuits that may be utilized for the preamplifier, amplifiers, one-shots, flip-flops, and logical gates shown in FIG. 3 are well known to those skilled in the art; representative circuits suitable for use in the present invention are shown in application Serial No. 8,391, filed February 12, 1960, now U.S. Patent 3,077,984, and application Serial No. 110,373, filed May 16, 1961, both of which are assigned to the assignee of the present invention.

The operation of the system of FIG. 3 may be described with the aid of the schematic diagram of FIG. 2. For example, assuming that a column of bits, shown in FIG. 2 as column 40, is to be sensed by the system of the present invention, the bits 42 each pass one of the sensing means 60 of FIG. 3. Since the bits are not in perfect alignment, the bits will not be sensed simultaneously. Therefore, when the first bit, bit 47 in this example, is detected by the corresponding one of the sensing means 60, a signal is generated by that sensor, and applied to the corresponding preamplifier, for example, preamplifier 62. The signal is amplified by preamplifier 62 and applied to the amplifier 72 for further amplification and application to the logical gates 80 and 81. Immediately upon receiving a positive voltage level from amplifier 72, logical gate 80 will generate a positive voltage level and apply this voltage to logical gate 82. It will be assumed that the system of FIG. 3 is quiescent, that is, it is in a state of readiness and flip-flops 85, 86, and 87 are in their reset state, and one-shot 91 is in its stable state. Accordingly, both input signals to AND-gate 82 will be positive voltage levels, and a positive voltage level will be generated thereby and applied to the set input terminal of flip-flop 86. Upon application of the next succeeding clock pulse to the flip-flop 86, the flip-flop will assume the set state, and the 1 output thereof will be raised to a positive voltage level. Since the 1 output of flip-flop 86 is connected to one-shot 91 and to the set input of flip-flop 87, the next succeeding clock pulse from the clock pulse system 95 will cause one-shot 91 to be fired, and flip-flop 87 to assume the set state and raise the 1 output thereof to the positive voltage level.

Simultaneously, flip-flop 86 will be returned to the reset state since the 1 output thereof is directly connected to the reset input terminal. Since flip-flop 87 is in the set state, the 1 output terminal thereof is at a positive voltage level, and one of the two input terminals of AND-gate 90 is therefore at a positive voltage level. The other of the two input terminals of the AND-gate 90 is supplied by the one-shot 91; however, one-shot 91 was fired simultaneously with the change of state of flip-flop 87. Therefore, the output of one-shot 91, and thus the second input terminal to AND-gate 90, is not at a positive voltage level, thereby preventing AND-gate 90 from generating a positive voltage level.

When bit 47 of column 40 was sensed by the corresponding bit sensor, and the signal amplified by preamplifier 62 and amplifier 72, the resulting amplified signal was applied to logical gate 80 and 81 simultaneously. As explained previously, logical gate 80 generated a positive voltage level in response to the application of the signal from amplifier 72; however, logical gate 81, being an AND-gate, will not respond to the application of any single input signal thereto. Rather, logical gate 81 requires a simultaneous application of a positive voltage level to all of the input terminals thereof. Amplifier 72 will continue to provide an output signal in response to a sensed bit for one clock period. Therefore, the signal from amplifier 72 will continue to be applied to logical gates 80 and 81 for a brief interval of time. During this interval of time, the remaining bits of the colum of bits 40 are read by the corresponding sensors 60, and the signals generated thereby are amplified by corresponding preamplifiers and amplifiers and applied to the logical gates 80 and 81.

When all of the bits have been read, and assuming that the last bits in a column of bits have been read within the time that the amplifier 72 continues to generate an output signal, (since the allowable time for reading a column of bits will always be less than the column-to-column spacing or clock period), positive voltage levels will be applied to all of the input terminals of the logical gate 81. Consequently, a positive voltage will be generated by the logical gate 81 and applied to the set input terminal of the flip-flop 85. Subsequently, at the next clock pulse, flip-flop 85 will assume the set state, and the 1 output thereof will assume a positive voltage level. This positive voltage level from the 1 output of flip-flop 85 is applied to the reset terminal of flip-flop 87. At the receipt of the next clock pulse, flip-flop 87 will assume the reset state, and the 1 output thereof will no longer be at the positive voltage level. At the expiration of the predetermined time delay of one-shot 91, the one-shot will assume the stable state, and the output thereof will assume the positive voltage level. Therefore, the inputs to AND-gate 90 will be a negative voltage level from flip-flop 87 and a positive voltage level from one-shot 91; therefore, no signal will be generated by AND-gate 90.

If the last bits of the column of bits 40 had not been received before one-shot 91 had resumed its stable state, the output from the one-shot 91 would be at a positive voltage level, and the flip-flop 87 (not having been returned to the reset state by application of a positive voltage level from flip-flop 85) would have supplied a positive voltage level to AND-gate 90. Since two positive voltage levels would have been applied to the logical AND-gate 90, a positive voltage level, representing an error signal, would have been generated thereby.

If the system of FIG. 3 were utilized to detect a column of bits such as that shown as column 30 in FIG. 2, it may be seen that the first bit detected would cause flip-flop 87 to assume the set state, and would cause one-shot 91 to assume an unstable state for a predetermined time. If the last bit of the column of bits is detected before the one-shot 91 recovers, then flip-flop 87 will be reset before the one-shot 91 recovers, and no error signal will be generated by the AND-gate 90. However, if the last bits of the column of bits of column 30 is sensed after one-shot 91 recovers, the AND-gate 90 will have positive voltage levels applied thereto by flip-flop 87 and one-shot 91, and will therefore generate a positive voltage level, or an error signal. Similarly, if the system of FIG. 3 were utilized to read the column of bits 50 of FIG. 2, it may be seen that since one of the bits is missing, AND-gate 81 cannot generate a positive voltage level to cause flip-flop 85 to assume the set state, and flip-flop 87 will not be driven to the reset state; thus, one-shot 91 will recover and provide a positive voltage level to the AND-gate 90 while flip-flop 87 is in its set state thus also providing a positive voltage level to the AND-gate 90. An error signal from the AND-gate 90 will therefore be generated to indicate the absence of a bit.

It may be seen that a missing bit, excessive column skew, or excessive misalignment of the bits of a column of bits will cause the system of the present invention to generate an error signal to indicate that the limits of the designated bit column irregularities have been exceeded. The maximum time for the recognition of a bit in a column of bits may be adjusted by adjusting the delay of the one-shot 91. Therefore, the tolerances for the various irregularities of a column of bits recorded on a storage media may be set by adjusting the predetermined time delay of the one-shot 91.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. Apparatus for detecting irregularities in a column of binary bits recorded on a storage media comprising, a plurality of sensing means each adapted to sense one of the binary bits of a column of binary bits and to generate a sensing signal when a bit is sensed, a first circuit connected to said sensing means and adapted to generate a first gating signal in response to sensing signals received from any of said sensing means, a second circuit connected to said sensing means and adapted to generate a second gating signal when said second circuit receives sensing signals from all of said sensing means, a bistable circuit connected to receive said first and second gating signals and adapted to assume a first stable state upon receipt of said first gating signal and to assume a second stable state upon receipt of said second gating signal, timing means connected to receive said first gating signal and adapted to assume a timing state for a predetermined time upon receipt of said first gating signal, and means connected to said bistable circuit and to said timing means for generating an error signal when said bistable circuit is in said first stable state while said timing means is not in said timing state.

2. Apparatus for detecting irregularities in a column of binary bits recorded on a storage media comprising, a plurality of sensing means each adapted to sense one of the binary bits of a column of binary bits and to generate a sensing signal when a bit is sensed, a logical OR-circuit connected to said sensing means and adapted to generate a first gating signal in response to sensing signals received from any of said sensing means, a logical AND-circuit connected to said sensing means and adapted to generate a second gating signal when said AND-circuit receives sensing signals from all of said sensing means, a bistable circuit connected to receive said first and second gating signals and adapted to assume a first stable state upon receipt of said first gating signal and to assume a second stable state upon receipt of said second gating signal, timing means connected to receive said first gating signal and adapted to assume a timing state for a predetermined time upon receipt of said first gating signal, and means connected to said bistable circuit and to said timing means for generating an error signal when said bistable circuit is in said first stable state while said timing means is not in said timing state.

3. Apparatus for detecting irregularities in a column of binary bits recorded on a storage media comprising, a plurality of sensing means each adapted to sense one of the binary bits of a column of binary bits and to generate a sensing signal when a bit is sensed, a logical OR-circuit connected to said sensing means and adapted to generate a first gating signal in response to sensing signals received from any of said sensing means, a logical AND-circuit connected to said sensing means and adapted to generate a second gating signal when said AND-circuit receives sensing signals from all of said sensing means, a bistable circuit connected to receive said first and second gating signals and adapted to assume a first stable state upon receipt of said first gating signal and to assume a second stable state upon receipt of said second gating signal, a monostable circuit connected to receive said first gating signal and adapted to assume an unstable state for a predetermined time, and means connected to said bistable circuit and to said monostable circuit for generating an error signal when said bistable circuit is in said first stable state while said monostable circuit is not in said unstable state.

4. Apparatus for detecting irregularities in a column of binary bits recorded in a storage media comprising, a plurality of sensing means each adapted to sense one of the binary bits of a column of binary bits and to generate a sensing signal when a bit is sensed, a first circuit connected to said sensing means and adapted to generate a first gating signal in response to sensing signals received from any of said sensing means, a second circuit connected to said sensing means and adapted to generate a second gating signal when said second circuit receives sensing signals from all of said sensing means, a bistable circuit connected to receive said first and second gating signals and adapted to assume a first stable state upon receipt of said first gating signal and to assume a second stable state upon receipt of said second gating signal, timing means connected to receive said first gating signal and adapted to assume a timing state for a predetermined time upon receipt of said first gating signal, and a logical AND-circuit connected to said bistable circuit and to said timing means for generating an error signal when said bistable circuit is in said first stable state while said timing means is not in said timing state.

5. Apparatus for detecting irregularities in a column of binary bits recorded on a storage media comprising, a plurality of sensing means each adapted to sense one of the binary bits of a column of binary bits and to generate a sensing signal when a bit is sensed, a logical OR-circuit connected to said sensing means and adapted to generate a first gating signal in response to sensing signals received from any of said sensing means, a logical AND-circuit connected to said sensing means and adapted to generate a second gating signal when said AND-circuit receives sensing signals from all of said sensing means, a bistable circuit connected to receive said first and second gating signals and adapted to assume a first stable state upon receipt of said first gating signal and to assume a second stable state upon receipt of said second gating signal, a monostable circuit connected to receive said first gating signal and adapted to assume an unstable state for a predetermined time, and a second logical AND-circuit connected to said bistable circuit and to said monostable circuit for generating an error signal when said bistable circuit is in said first stable state while said monostable circuit is not in said unstable state.

6. Apparatus for detecting irregularities in a column of binary bits recorded on a storage media comprising, a plurality of sensing means each adapted to sense one of the binary bits of a column of binary bits and to generate a sensing signal when a bit is sensed, a first circuit connected to said sensing means and adapted to generate a first gating signal in response to sensing signals received from any of said sensing means, a second circuit connected to said sensing means and adapted to generate a second gating signal when said second circuit receives sensing signals from all of said sensing means, a first bistable circuit connected to receive said first gating signal and adapted to assume a first stable state in response to said first gating signal, a second bistable circuit connected to receive said second gating signal and adapted to assume a first stable state in response to said second gating signal, means connecting said second bistable circuit to said first bistable circuit for causing said first bistable circuit to assume a second stable state when said second bistable circuit assumes said first stable state, a monostable circuit connected to receive said first control signal and adapted to assume an unstable state for a predetermined time upon receipt of said first gating signal, and a logical gate connected to said first bistable circuit and to said monostable circuit for generating an error signal when said first bistable circuit is in said first stable state while said monostable circuit is not in said unstable state.

7. Apparatus for detecting irregularities in a column of binary bits recorded on a storage media comprising, a plurality of sensing means each adapted to sense one of the binary bits of a column of binary bits and to generate a sensing signal when a bit is sensed, a first circuit connected to said sensing means and adapted to generate a first gating signal in response to sensing signals received from any of said sensing means, a second circuit connected to said sensing means and adapted to generate a second gating signal when said second circuit receives sensing signals from all of said sensing means, a first bistable circuit connected to receive said first gating signal and adapted to assume a first stable state in response to said first gating signal, a second bistable circuit connected to receive said second gating signal and adapted to assume a first stable state in response to said second gating signal, and means connecting said second bistable circuit to said first bistable circuit for causing said first bistable circuit to assume a second stable state when said second bistable circuit assumes said first stable state.

8. Apparatus for detecting irregularities in a column of binary bits recorded on a magnetic tape comprising, a plurality of read heads each adapted to sense one of the binary bits of a column of bits and to generate a sensing signal when a bit is sensed, a first circuit connected to said read heads and adapted to generate a first gating signal in response to sensing signals received from any of said read heads, a second circuit connected to said read heads and adapted to generate a second gating signal when said second circuit receives sensing signals from all of said read heads, a bistable circuit connected to receive said first and second gating signals and adapted to assume a first stable state upon receipt of said first gating signal and to assume a second stable state upon receipt of said second gating signal, timing means connected to receive said first gating signal and adapted to assume a timing state for a predetermined time upon receipt of said first gating signal, and means connected to said bistable circuit and to said timing means for generating an error signal when said bistable circuit is in said first stable state while said timing means is not in said timing state.

9. Apparatus for detecting irregularities in a column of binary bits recorded on a magnetic tape comprising, a plurality of read heads each adapted to sense one of the binary bits of a column of binary bits and to generate a sensing signal when a bit is sensed, a first circuit connected to said read heads and adapted to generate a first gating signal in response to sensing signals received from any of said read heads, a second circuit connected to said read heads and adapted to generate a second gating signal when said second circuit receives sensing signals from all of said read heads, a bistable circuit connected to receive said first and second gating signals and adapted to assume a first stable state upon receipt of said first gating signal and to assume a second stable state upon receipt of said second gating signal, a monostable circuit connected to receive said first gating signal and adapted to assume an unstable state for a predetermined time, and a logical AND-circuit connected to said bistable circuit and to said monostable circuit for generating an error signal when said bistable circuit is in said first stable state while said monostable circuit is not in said unstable state.

10. Apparatus for detecting irregularities in a column of binary bits recorded on a magnetic tape comprising, a plurality of read heads each adapted to sense one of the binary bits of a column of binary bits and to generate a sensing signal when a bit is sensed, a first circuit connected to said read heads and adapted to generate a first gating signal in response to sensing signals received from any of said read heads, a second circuit connected to said read heads and adapted to generate a second gating signal when said second circuit receives sensing signals from all of said read heads, a first bistable circuit connected to receive said second gating signal and adapted to assume a first stable state in response to said first gating signal, a second bistable circuit connected to receive said second gating signal and adapted to assume a first stable state in response to said second gating signal, means connecting said second bistable circuit to said first bistable circuit for causing the latter to assume a second stable state when the former assumes a first stable state, a monostable circuit connected to receive said first gating signal and adapted to assume an unstable state for a predetermined time upon receipt of said first gating signal, and a logical gate connected to said first bistable circuit and to said monostable circuit for generating an error signal when said first bistable circuit is in said first stable state while said monostable circuit is not in said unstable state.

References Cited by the Examiner

UNITED STATES PATENTS

| | | | |
|---|---|---|---|
| Re. 24,641 | 4/59 | Reynolds | 340—174.1 |
| 2,793,344 | 5/57 | Reynolds | 340—174.1 |
| 2,813,259 | 11/57 | Burkhart | 340—174.1 |
| 2,817,829 | 12/57 | Lubkin | 340—174.1 |
| 2,907,989 | 10/59 | Guerber | 340—174.1 |
| 2,929,049 | 3/60 | Lubkin | 340—174.1 |

IRVING L. SRAGOW, *Primary Examiner.*